Dec. 3, 1963 W. E. KOHMAN 3,112,901
PROPELLER CONTROL SYSTEM
Filed June 2, 1961 2 Sheets-Sheet 2
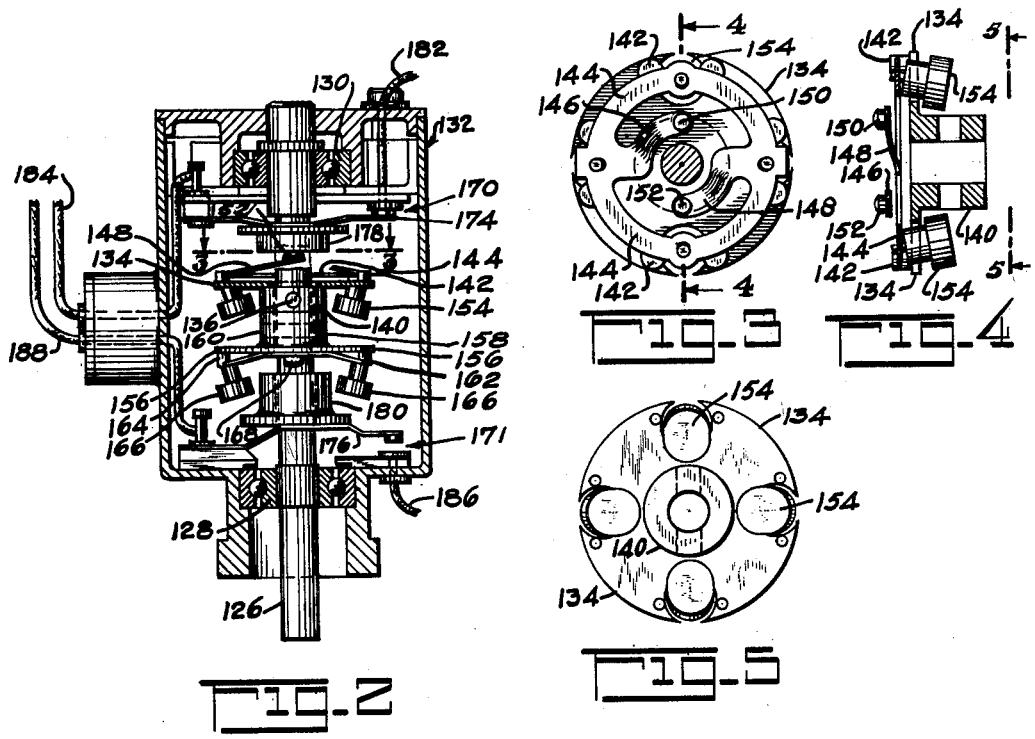
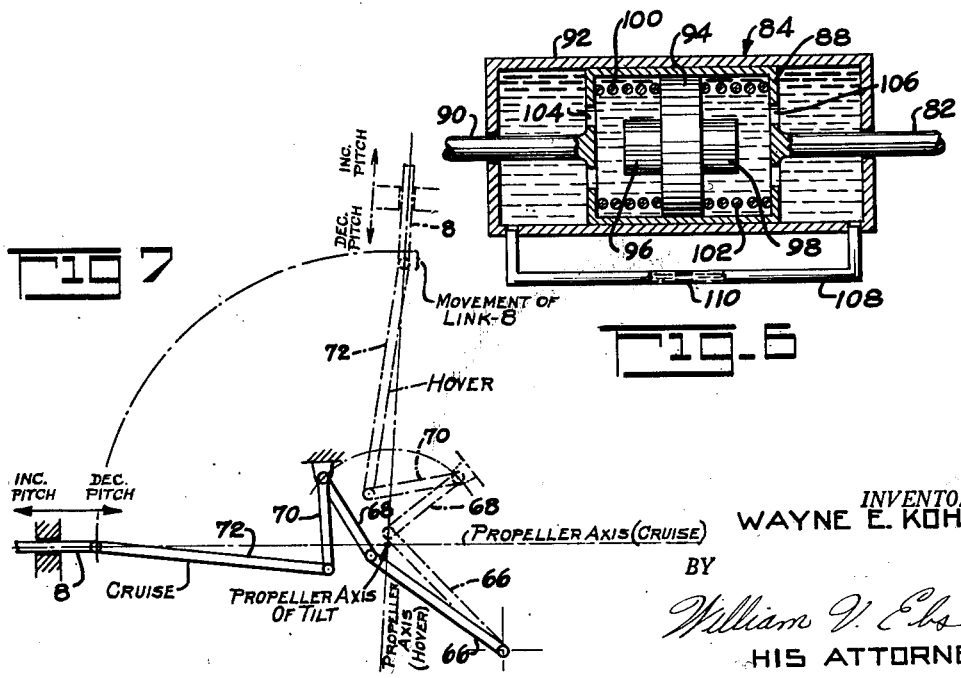
INVENTOR.
WAYNE E. KOHMAN
BY
William V. Ebs
HIS ATTORNEY United States Patent Office 3,112,901
Patented Dec. 3, 1963

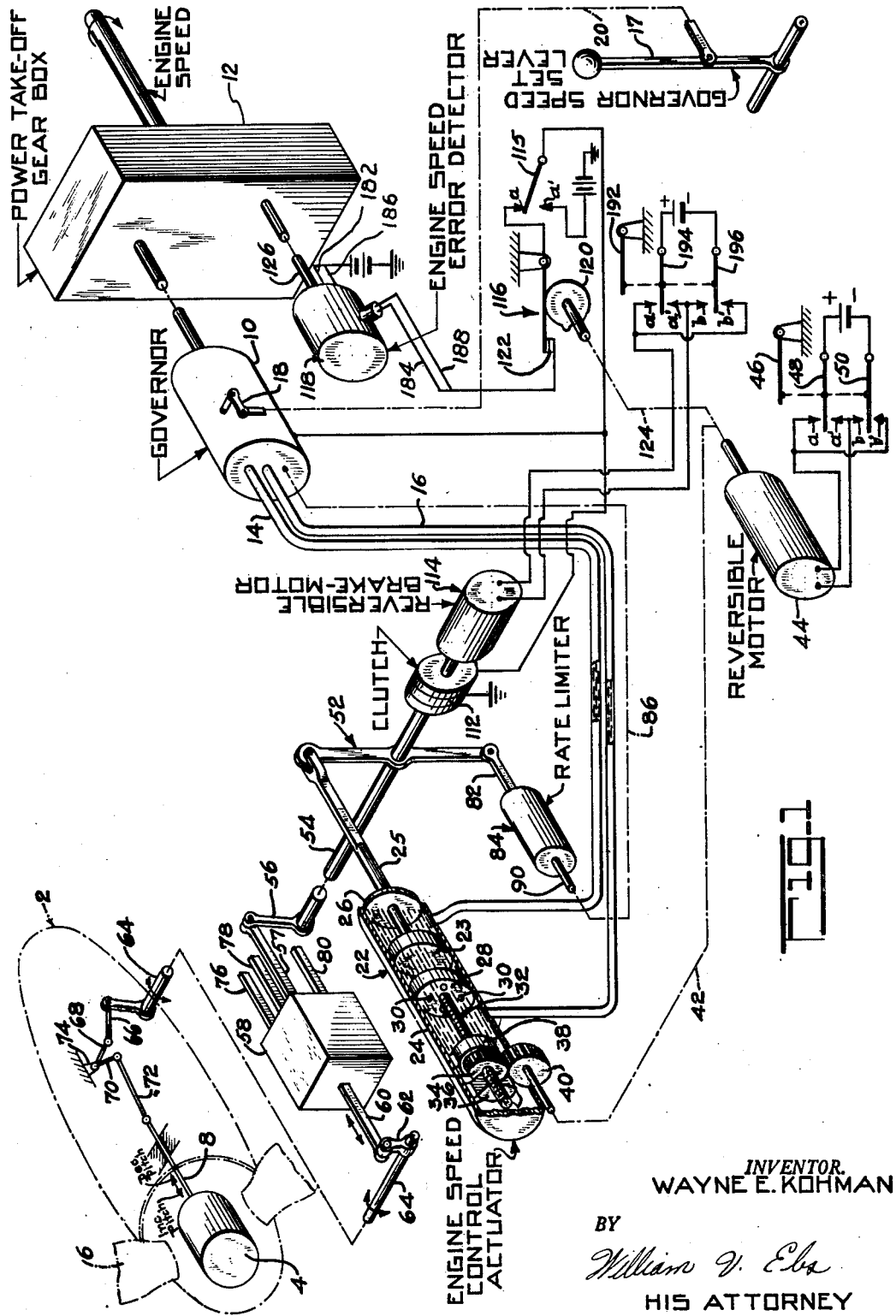

3,112,901
PROPELLER CONTROL SYSTEM
Wayne E. Kohman, Morris Plains, N.J., assignor to Curtiss-Wright Corporation, a corporation of Delaware
Filed June 2, 1961, Ser. No. 120,857
11 Claims. (Cl. 244—7)

My invention relates to control systems for maintaining the speed of rotation of aircraft propellers constant by varying propeller blade angle.

The system of the invention is particularly applicable to vertical take-off and landing aircraft having a plurality of propellers which are driven in unison through shafting connected to a common power source and which may be tilted between nearly vertical and substantially horizontal positions to accomplish a transition between vertical and horizontal modes of flight. Such an aircraft is shown in the patent application of Norman C. Olson, Serial No. 91,683, filed February 27, 1961, and assigned to Curtiss-Wright Corporation.

An object of the invention is to provide a speed control system for such aircraft wherein no probable failure or combination of probable failures shall permit an overspeed or underspeed condition such that the propellers produce insufficient thrust to sustain flight.

Another object of the invention is to provide such a speed control system for VTOL aircraft with tiltable propellers wherein collective blade angle limits are established according to the angle of tilt of the propellers.

Other objects and advantages of the invention will become apparent hereinafter.

The speed control system, by means of which the objects and advantages of the invention are achieved, includes automatic control means comprising a speed governor and an actuator responsive to governor signals for effecting blade angle changes to maintain a substantially constant propeller speed selected by the pilot. Manual control means, which may be employed to effect blade angle changes in the event of a failure in automatic control components, are also provided. The manual control components of the system are disconnected from the propeller during automatic control of blade angle by the governor but may be automatically connected thereto for use if the governor control should become ineffective. Maximum and minimum blade angle limits beyond which blade angle changes to maintain a substantially constant established for the propeller according to the angle of tilt of the propeller. The limits are established fairly close together in the nearly vertical positions of the propeller and provide good protection against overspeeding or underspeeding of the propellers. The limits are moved apart as the propellers are tilted downwardly towards substantially horizontal positions because of the widening range of flight speeds as the propellers tilt down and the need for the propeller blades to operate through a wider blade angle range. The limits cease to afford desired protection against overspeeding or underspeeding when the propellers are in or near their cruise positions (the substantially horizontal positions). In order to provide such protection suitable means are provided to limit the rate at which blade angle change may occur and thereby afford the pilot an opportunity to utilize his manual control means.

Referring to the drawings:

FIG. 1 is a diagrammatic view showing the control system of the invention,

FIG. 2 is a sectional view showing an engine speed error detector which constitutes one of the components of the control system, FIG. 3 is a view taken on the plane of the line 3—3 of FIG. 2, FIG. 4 is a cross sectional view taken on the plane of the line 4—4 of FIG. 3, FIG. 5 is a view taken on the plane of the line 5—5 of FIG. 4, FIG. 6 is a sectional view showing a rate limiter used in the control system of the invention, FIG. 7 is a view showing the disposition of a four-bar propeller linkage in hover and cruise positions of the propeller.

Referring to FIG. 1 of the drawings reference character 2 designates one of a plurality of tiltable propellers of a VTOL aircraft of the type shown, for example, in the aforementioned patent application of Norman C. Olson, Serial No. 91,683. The propeller includes mechanism 4 for actuating the propeller blades 6 to change pitch. Such pitch changing mechanism 4 which may be any suitable type, is controllable in accordance with the movement of rod 8.

Propeller speed is regulated to a constant value by a governor 10, which is engine driven through reduction gearing in power take-off gear box 12. The governor controls pressure in fluid carrying lines 14 and 16 according to variations in engine speed with respect to a set speed which is selected by the pilot. The set speed is established for the governor by manipulation of a governor speed set lever 17 which positions governor input lever 18, being connected thereto by mechanical connection 20. The governor may be of the type shown, for example, in Patent No. 2,640,550 issued to G. P. Knapp et al. on June 2, 1953.

Lines 14 and 16 connect with an actuator 22 as shown. The actuator includes a piston 23 which is axially movable in cylinder 24. The piston connects with and actuates piston rod 25. Travel of the piston in one direction is limited by a fixed stop 26 constituting one end of the actuator cylinder, and travel in the other direction is limited by a movable stop 28. The stop 28 includes openings 30 which permit the passage of fluid through the part. Affixed to the stop 28 is a screw rod 32 which has a rotatable nut 34 threaded thereon. Members 36 and 38 affixed to the actuator cylinder prevent axial movement of the nut 34. The periphery of nut 34 is formed as a gear and is engaged by a pinion 40 which is drivably connected through mechanical connection 42 with propeller tilting motor 44.

Motor 44 corresponds to the motor 38 of the aforesaid Olson patent application, and connects as shown in said application with the propellers for moving the propeller axes of rotation between nearly vertical and substantially horizontal positions. The connections between motor 44 and propeller 2 have been eliminated from FIG. 1, in the interest of clarity. When the motor 44 is energized propeller axes are moved between their nearly vertical and nearly horizontal positions and at the same time the pinion 40 is driven to adjust stop 28. Energization of the motor 44 is controlled by switch 46 which may be manipulated to position contact arms 48 and 50 against contacts *a* and *b* respectively to run the motor in one direction or against contacts *a'* and *b'* respectively to run the motor in the other direction. The contact arms may also be positioned between associated contacts in which event the motor is de-energized.

Actuator 22 connects with propeller 2 through piston rod 25, link 52, shaft 54, link 56, link 57, summing device 58, links 60 and 62, and shaft 64. The propeller includes a four-bar linkage comprising the elements 66, 68, 70 and 72 of which elements 68 and 70 are swingable about a fixed pivot at 74 in the propeller housing. Such four-bar linkage connects shaft 64 with the rod 8. The summing device 58 is constructed in the manner shown in FIG. 21 of the Olson patent application, that is, so that the output movement of link 60 represents the sum of the movement of input links 56, 76, 78 and 80. The links 76, 78 and 80 are part of the system described in the Olson patent application for regulating blade pitch to control the attitude of the aircraft in roll, pitch and yaw. Such system does not constitute part of this invention and the links 76, 78 and 80 are assumed to remain stationary. Only the movement of link 56 and the resultant movement of link 60 is considered. As shown, link 52 which pivotally connects at one end with the piston rod 25 pivotally connects at the other end with the actuating link 82 of a rate limiter 84. The link 52 is secured at an intermediate location to the shaft 54. A feedback connection extends from the actuator over piston rod 25, and links 52 and 82, through the rate limiter 84 and over mechanical connection 86 to the governor 10.

As noted hereinbefore the governor controls blade pitch to maintain propeller speed constant by regulating fluid pressure in lines 14 and 16. When engine speed increases over set speed, increased pitch is called for and the governor functions to increase pressure in line 14 and in the actuator cylinder between piston 23 and stop 26 such that the piston 23 and piston rod 25 are forced to the left as viewed in FIG. 1. The piston rod 25, acting through links 52, 54, 56, 57, summing device 58, links 60 and 62, shaft 64, the propeller four-bar linkage and rod 8 actuates the pitch changing mechanism 4 to increase blade pitch. When engine speed falls below the set speed the governor functions to increase pressure in line 16, and in the actuator cylinder to the left of piston 23 as viewed in FIG. 1. The piston and piston rod are moved to the right to effect a decrease in pitch of propeller blades. Actuator piston movements are fed back to the governor over the feedback connection mentioned hereinbefore, extending from the piston to the governor to close a control loop for the actuator.

In the event of a loss in pressure in the actuator cylinder on one side of the piston for any reason, the piston would move in one direction or the other depending upon which side of the piston the loss of pressure occurred. The piston, however, would only move to decrease or increase blade angle until it contacted stop 26 at some minimum blade angle or stop 28 at a maximum blade angle respectively. Although stop 26 is fixed, the minimum blade angle, nevertheless, varies with the angle of tilt of the propellers because of the movement of the four-bar linkage in the propeller as the propeller is tilted between nearly vertical and substantially horizontal positions. Minimum blade angle is less in the hover position of the propeller (nearly vertical) than in the cruise position (substantially horizontal). This can readily be seen from FIG. 7 which shows the positions of the links of the four-bar linkage for minimum blade angle in both the hover and cruise position of the propeller. If the stop 28 were fixed, maximum blade angle would increase with decreasing angle of tilt of the propeller axis, i.e., as the propeller axis of rotation moved toward the substantially horizontal position such that the maximum blade angle would be greater than the minimum blade angle (by substantially the same amount) in both hover and cruise. As noted hereinbefore, however, the position of stop 28 varies as the angle of tilt of the propeller is varied. When the propeller is in its nearly vertical position the movable stop is at its minimum distance from the fixed stop. However, when the propeller is in the substantially horizontal position, i.e., the cruise position, movable stop 28 is disposed in the actuator cylinder at a maximum distance from fixed stop 26. This is the position of the movable stop in FIG. 1 of the drawings. The movement of stop 28, with changing angle of tilt of the propellers widens the difference between the maximum and minimum blade angle with decreasing angle of tilt of the propeller. A wider range for blade angle change is required as the cruise condition is approached, because of the greater range of flight speeds possible as the propellers are tilted downwardly.

The rate limiter 84 functions to limit the rate at which large blade angle changes may occur. As may be seen in FIG. 6, the rate limiter includes a hollow piston 88, one end of which is integral with link 82, and the other end of which is integral with rod 90 constituting a portion of mechanical connection 86. The piston 88, which is slidable in cylindrical housing 92 encases a piston 94 having abutments 96 and 98 on opposite sides thereof. Springs 100 and 102 bias piston 94 toward a central location within piston 88. The cylindrical housing 92 and hollow piston 88 are filled with fluid. A plurality of openings 104 are provided in one end of piston 88 and similar openings 106 are provided in the other end of the piston 88 to permit fluid to flow into and out of piston 88. Opposite end portions of cylindrical housing 92 are connected by fluid carrying line 108 which includes an orifice 110 that restricts the rate of flow of fluid through the line.

While propeller 2 operates at a particular blade angle, shaft 54 is stationary. Link 82 and piston 88 are, therefore, also stationary, and piston 94 is centrally located within piston 88 as shown in FIG. 6. When blade angle is changed, angular movement is imparted to shaft 54 and link 82 moves in one direction or the other according to the direction of blade angle change. Inasmuch as the rate limiter operates in a similar fashion regardless of the direction of the blade angle change, a description of the mode of operation for movement of link 82 in one direction will suffice. Assuming blade angle change is in a direction such that link 82 is moved to the left as viewed in FIG. 6, the right end of piston 88 moves to contact abutment 98 on piston 94, compressing spring 102. Fluid flows through the openings 104 and 106 and does not substantially restrict movement of the piston 88 while the piston 88 is moving to contact the abutment 98. Motion of piston 94 is prevented prior to the time when the end wall of piston 88 contacts abutment 98 by fluid pressure on the left side of piston 94, the force exerted by spring 102 on piston 94 being insufficient to force an appreciable amount of fluid through orifice 110 in line 108. However, once piston 88 contacts abutment 98, piston 94 is caused to move with piston 88 and liquid is forced by piston 94 through line 108. The fluid can flow through orifice 110 in line 108 only at a restricted rate and, therefore, movement of piston 88, link 82, and shaft 64, can occur at only a restricted rate. The rate limiter then, while permitting rapid small blade angle change, such as is normally encountered during governor control of blade angle (up to, for example, about ±1°) permits additional blade angle change only slowly. The rapid occurrence of a large blade angle change, which a failure in the hydraulic system might tend to produce when the actuator stops are widely separated (at or near cruise), is prevented.

Shaft 54 connects with an electro-magnetic clutch 112. When the clutch is energized, the shaft 54 is mechanically connected to a brake-motor 114. When the clutch is de-energized, shaft 54 is disconnected from brake-motor 114. The brake-motor 114 may be of any suitable type comprising a brake and motor in combination, which operate in such fashion that the brake is released when the motor is energized, but is engaged when the motor is de-energized. The clutch 112 is energized over a circuit which includes switch 115, cam operated means 116 and engine speed error detector 118. The cam operated means 116 comprises cam element 120 and contacts 122. The cam element 120 is operable through mechanical connection 124 by motor 44. The cam element 120 functions to open contacts 122 when the propellers, which as mentioned hereinbefore, are tilted by motor 44, attain substantially vertical positions, that is, their hover positions. At other times the contacts 122 are closed. The clutch 112 is normally de-energized while propeller blade angle is being controlled by the governor although contact 115a and contacts 122 are closed, the energizing circuit for the clutch being open at engine speed error detector 118. The energizing circuit for the clutch is closed by the engine speed error detector however, if engine speed exceeds or drops below a predetermined speed by more than a predetermined amount.

The engine speed error detector (shown in detail in FIGS. 2–5) has an input shaft 126 which is rotated through the reduction gearing in power take-off box 12. The shaft 126 is rotatably mounted in bearings 128 and 130 which are affixed in housing 132. A circular plate 134 is fixedly secured on shaft 126 by a pin 136 which extends through the shaft and hub structure 140, the hub structure being integral with the plate 134. The plate 134 includes a plurality of posts 142 which support the edge of a snap action flexible member 144. Flexible member 144 includes arms 146 and 148 having buttons 150 and 152 respectively thereon. Secured to the flexible member near the edge are a plurality of weights 154 which swing outwardly as the speed of shaft 126 is increased. A second circular plate 156 is also secured to shaft 126 as by pin 158, extending through integral hub structure 160. The plate 156 is similar in construction to the plate 134, being provided with a snap action member 162 mounted on posts 164 and weights 166 which suspend from the member 162. Buttons such as 168 are mounted on the member. Two pair of contacts 170 and 171, which are opened and closed by resilient arms 174 and 176 respectively, are provided in the engine speed error detector. Spring action of the contact arms acts to open the contact pairs. Pressure is, however, applied at times to contact arm 174 by buttons 150 and 152 acting through member 178 which is slidable on shaft 126 to close contact pair 170, and at other times to contact arm 176 by buttons such as 168 acting through member 180 which is slidable on shaft 126 to close contact pair 171. The closing and opening of the contact pairs depends upon the speed of shaft 126 as determined by engine speed.

When engine speed is zero so that shaft 126 is not rotating contact pair 170 is closed and contact pair 171 is open. This is the condition shown in FIG. 2 of the drawings. A predetermined increase in engine speed causes weights 154 on plate 134 to deflect member 144 such that pressure between the contacts of contact pair 170 is sufficiently reduced to cause the contacts to be opened by the spring action of contact arm 174. When engine speed is within a predetermined desirable range, both contact pairs are open. If engine speed should drop below the desirable speed range, however, weights 154 on plate 134 act to deflect member 144 and the buttons 150 and 152 are caused to bear against member 178 which in turn bears against contact arm 174 to thereby close the contacts of contact pair 170. If engine speed increases beyond the desirable range, weights 166 act to deflect member 162 whereupon the buttons, such as 168 on the member react against 180, which is slidable on shaft 126, causing member 180 to bear against contact arm 176 and close the contacts of contact pair 171.

The energizing circuits for clutch 112 includes parallel paths through the engine speed error detector 118. One such path includes lead 182, contact pair 170 and lead 184. The other such path includes lead 186, contact pair 171 and lead 188. Both contact pairs 170 and 171 are open when the engine is operating within the desirable speed range. Assuming that switch 115 is positioned to close contact 115a and assuming that the propeller is in other than the hover position so that contacts 122 are closed, nevertheless while propeller speed is being properly controlled by the governor, the energizing circuit for clutch 112, extending over contacts 115a and 122, is therefore open at the speed error detector 118. If, however, a governor failure should occur, resulting in dangerous overspeeding or underspeeding of the propeller, one set of contacts in the engine speed error detector is caused to close as described to complete the clutch circuit. Energization of the clutch couples the clutch to the motor of brake-motor 114 to permit the pilot to control blade pitch manually by the operation of switch 192 which controls switch arms 194 and 196. Movement of the switch 192 in one direction closes contact 194a and 196b to cause the motor to be operated in one direction, and movement of the switch 192 in the other direction causes contacts 194a' and 196b' to be operated in the other direction. Rotational movement is imparted to shaft 54 by the motor acting through the clutch 112 to increase or decrease pitch according to the direction in which switch 192 has been moved. As noted hereinbefore, large blade angle changes can occur only slowly because of the rate limiter. The pilot is, therefore, afforded an opportunity to exercise his manual control of the blade angle by the operation of switch 192 before overspeeding or underspeeding can reach proportions endangering the aircraft. It has been mentioned that the cam operated means 116 functions to open contacts 122 in the clutch energizing circuit extending through the speed error detector and over contacts 122 and 115a when the propeller moves into its hover position. Provision is made for opening said clutch circuit in hover to permit operation at greater speeds in hover than the engine speed error detector will permit. Overspeed protection is, nevertheless, afforded in hover by the adjustable actuator stop.

The pilot can exercise manual control of the clutch should the clutch energizing circuit extending through the engine speed error detector fail to function properly. It is only necessary for the pilot to close contact 115a' to energize the clutch, whereupon he may manually control blade angle by the operation of switch 192 in the manner described.

Clearly, the control system of the invention provides a high degree of protection against dangerous overspeeding or underspeeding of the propellers, the arrangement being such that no probable failure or combination of probable failures is likely to result in overspeeding or underspeeding such that the propellers produce insufficient thrust to sustain flight. When considered desirable, the system might be simplified by the elimination of certain features without unduly limiting this protection. For example, only fixed stops spaced to permit the maximum blade angle change, which might be called for in cruise, might be provided in the actuator in place of the one fixed and one movable stop described. Although this change would eliminate the protection afforded by the movable stop against underspeeding in the hover position of the propeller, the pilot could still rely on the operation of the rate limiter and the availability of his manual control to prevent large blade angle change when the propeller is in the hover position. As part of such change the four-bar linkage might be reproportioned in such manner that a greater stroke of the actuator piston would be required to change blade angle in the hover position of the propeller, where a large blade angle change is more apt to have disastrous consequences than in the cruise position. In addition, the engine speed error detector might be eliminated.

Various other changes and modifications might be made in the system without departing from the spirit and scope of the invention as set forth in the appended claims.

What is claimed is:

1. In a speed control system for an engine driven aircraft propeller tiltable between a nearly vertical and substantially horizontal position, and including pitch changing mechanism for varying propeller blade angle, the combination comprising an engine driven governor, an actuator responsive to operation of the governor for controlling the pitch changing mechanism to maintain constant the speed of the propeller, means limiting blade angle change to a predetermined maximum and predetermined minimum range in the nearly vertical position of the propeller, and means for changing the maximum permissible blade angle and minimum permissible blade angle in an opposite sense as the propeller is tilted from the nearly vertical to the substantially horizontal position.

2. The combination as defined in claim 1 wherein the maximum permissible blade angle is increased and the minimum permissible blade angle is decreased as the propeller is tilted from the nearly vertical to the substantially horizontal position.

3. The combination as defined in claim 1 including rate limiter means operatively connected to the actuator providing for an increment of blade angle change at one rate and additional blade angle change at a lesser rate.

4. The combination as defined in claim 1 with a feedback connection extending from the actuator to the governor, said feedback connection including means providing for an increment of blade angle change at one rate and additional blade angle change at a lesser rate.

5. In a speed control system for an engine driven aircraft propeller tiltable between a nearly vertical and substantially horizontal position, and including pitch changing mechanism for varying propeller blade angle, the combination comprising an engine driven governor, an actuator responsive to operation of the governor and having an output member operatively connected to the pitch changing mechanism for varying blade angle to maintain constant the speed of the propeller, means for limiting blade angle change including an adjustable stop for limiting movement of the actuator output member in one direction, means for adjusting the position of said stop as the propeller is tilted between the nearly vertical and predetermined nearly horizontal position, a fixed stop to limit pitch change in the other direction, and linkage means between the actuator and pitch changing mechanism adjusted as the propeller is tilted for varying the limits of blade angle change in the other direction during said tilting of the propeller.

6. In a speed control system for an engine driven aircraft propeller including pitch changing mechanism for varying propeller blade angle, the combination comprising an engine driven governor, an actuator responsive to operation of the governor for controlling the pitch changing mechanism to maintain constant the speed of the propeller, a rate limiter operatively connected to the actuator providing for an increment of blade angle change at one rate and additional blade angle change at a lesser rate, speed responsive contact means driven by the engine and operable whenever engine speed departs from a predetermined speed range, and means for manually modulating the blade angle connectable to the pitch changing mechanism upon operation of said speed responsive contact means.

7. In a VTOL aircraft having a tiltable engine driven propeller which includes pitch changing mechanism for varying propeller blade angle, the combination comprising an engine driven governor, an actuator responsive to operation of the governor for controlling the pitch changing mechanism to maintain constant the speed of the propellers, means operatively connected to the actuator providing for an increment of blade angle change at one rate and additional blade angle change at a lesser rate, means for manually controlling blade angle in the event of a failure of governor control, and a summing device between the actuator and the pitch changing mechanism including a plurality of input members one of which is responsive to actuator movements.

8. In a speed control system for an engine, the combination comprising, an engine driven governor for controlling engine speed to a constant value, an actuator responsive to the operation of the governor, mechanism controllable by the actuator for adjusting engine speed in accordance with the operation of the governor, means operatively connected to the actuator providing for an increment of change in speed at one rate and an additional change in speed at another rate, and speed responsive contact means driven by the engine and operated when engine speed departs from a predetermined speed range, and means for manually modulating engine speed connectable to said mechanism for adjusting engine speed upon operation of the speed responsive contact means.

9. In a speed control system for an engine driven aircraft propeller, tiltable between a nearly vertical and substantially horizontal position, and including pitch changing mechanism for varying propeller blade angle, the combination comprising an engine driven governor, an actuator responsive to operation of the governor for controlling the pitch changing mechanism to maintain constant the speed of the propeller, means operatively connected to the actuator for preventing more than a predetermined blade angle change at greater than a predetermined rate, speed responsive contact means driven by the engine and operable when engine speed departs from a predetermined speed range, means for manually controlling blade angle connectable to the pitch changing mechanism upon operation of said speed responsive means, and switching means responsive to the tilting of said propeller for disconnecting the manual control means from the pitch changing mechanism when the propeller is in the nearly vertical position.

10. In a speed control system for an aircraft having an engine driven propeller which is tiltable between nearly vertical and substantially horizontal positions and which includes pitch changing mechanism for varying propeller blade angle, the combination comprising an engine driven governor, an actuator responsive to operation of the governor for controlling the pitch changing mechanism to maintain constant the speed of the propeller, means operatively connected to the actuator providing for an increment of blade angle change at one rate and additional blade angle change at a lesser rate, means for manually modulating blade angle in the event of a failure of governor control, and linkage means between the actuator and pitch changing mechanism oriented as the propeller is tilted for varying the blade angle change resulting from given movements of the actuator in accordance with the angle of tilt.

11. The combination as defined in claim 9 including stop means in said actuator for limiting blade angle change.

References Cited in the file of this patent

UNITED STATES PATENTS

| | | |
|---|---|---|
| 2,284,902 | Hosford | June 2, 1942 |
| 2,478,847 | Stuart | Aug. 9, 1949 |
| 2,557,679 | Nichols | June 19, 1951 |
| 2,590,340 | Mordell et al. | Mar. 25, 1952 |
| 2,849,072 | Brahm | Aug. 26, 1958 |
| 3,073,547 | Fischer | Jan. 15, 1963 |

FOREIGN PATENTS

| | | |
|---|---|---|
| 603,487 | Great Britain | June 16, 1948 |
| 159,716 | Australia | Nov. 10, 1954 |